3,639,645
SCALE INHIBITING COMPOSITION AND METHOD USING PHOSPHONIC ACID AND DI- OR HYDROXY-CARBOXYLIC ACID

Glyn Miller, Oldbury, Warley, and Graham Michael Smart, Haley Green, Halesowen, England, assignors to Albright & Wilson Limited, Oldbury, Warwickshire, England
No Drawing. Filed Feb. 28, 1969, Ser. No. 803,457
Claims priority, application Great Britain, Feb. 28, 1968, 9,655/68
Int. Cl. C02b 5/06; C07c 55/02
U.S. Cl. 252—180                23 Claims

ABSTRACT OF THE DISCLOSURE

Synergistic threshold composition comprising an alkylene polyamino methylene phosphonic acid such as EDTMP and a di- or hydroxy-carboxylic acid.

---

The present invention relates to water treatment employing certain nitrogen containing methylene phosphonic acid derivatives. It is of particular significance in relation to threshold treatment in sea water evaporators.

The preparation of potable water by flash evaporation of contaminated sources, and particularly of sea water, is of growing importance. A major problem encountered during the evaporation of sea water is the deposition of scale on heat exchange surfaces, which seriously affects the efficiency of the evaporator.

It is known that certain compositions may be added to the brine in small quantities (e.g. 5–50 p.p.m.) to inhibit scale formation. Because of the extremely small quantities of the additive required, this inhibition is known as the threshold effect, and the compositions are referred to as threshold agents.

It is known that certain amino methylene phosphonic acids exhibit threshold activity, in particular amino tris (methylene phosphonic acid). We have now discovered that the effectiveness of amino methylene phosphonic acids and particularly alkylene polyamino methylene phosphonic acids such as ethylenediamine tetrakis (methylene-phosphonic acid) hereinafter referred to as EDTMP are synergistically improved by admixture with certain polycarboxylic acids.

Our invention therefore provides a composition for use in water treatment which comprises an aminomethylene phosphonic acid or an alkali metal or ammonium salt thereof, and a water soluble polycarboxylic acid or an alkali metal or ammonium salt thereof.

Preferably the aminoethylene phosphonic acid has the formula:

$$R''-[NR''R]_nNR''-CR'R'PO_3H_2$$

(wherein R is an alkylene group, each R' is hydrogen or an organic radical, and each R'' is hydrogen, an unsubstituted or substituted alkyl group of from 1 to 20 carbon atoms, or a phosphonomethylene group:

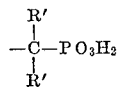

and $n$ is an integer from 1 to 5). Preferably R'' is a phosphono-methylene group $-CH_2PO_3H_2$. R' is preferably hydrogen. R preferably has from 2 to 4 carbon atoms and is most preferably ethylene. $n$ is preferably 1. The preferred phosphonic acid is EDTMP.

The polycarboxylic acids which may be employed in accordance with our invention are preferably dicarboxylic acids and perferably have from 4 to 10 carbon atoms, e.g. adipic, glutaric, azelaic, sebacic, succinic, suberic or pimelic acids. Hydroxy polycarboxylic acids may also be employed, e.g. citric or tartaric acids.

Conveniently the polycarboxylic acid may be present in the composition in any proportion up to about 70% by weight, preferably more than 10% and most preferably 20 to 60% by weight, e.g. 50%.

Our invention further provides a method of inhibiting scale formation during the evaporation of hard water which comprises adding thereto a threshold amount of a composition according to the invention.

Typically the composition for use in our invention is added in a total proportion of 0.25 to 100 parts per million (p.p.m.) by weight, preferably 0.5 to 20 p.p.m. and more preferably 1 to 10 p.p.m. e.g. 1.5 to 5 p.p.m.

In addition to exerting a threshold effect compositions according to our invention have been found to inhibit corrosion of metal surfaces. In order to provide a useful degree of inhibition it is preferred to add from 20 to 100 p.p.m. of the composition to water systems inducing metallic corrosion.

We have discovered that compositions of our invention also act as dispersants and may be used for dispersing particles of alluvial silt, kaolin or size in water. To obtain a satisfactory dispersion it is preferred to employ from 0.5 to 2% by weight of the composition.

The following examples illustrate the invention:

Various compositions of our invention were tested in a flash evaporator operating at 205° F. and a brine concentration factor of 3. Certain known threshold agents were tested for comparison. The relative weights of scale are indicated in the following table.

| Additive: | Weight of scale, gm. |
|---|---|
| 5 p.p.m commercial sodium polyphosphate/linin sulphonate mixture (comparative) | 1.24 |
| 3 p.p.m. amino tris(methylene phosphonic acid) (comparative) | 0.54 |
| 1.5 p.p.m. amino tris(methylene phosphonic acid) (comparative) | 0.48 |
| 3 p.p.m. EDTMP (comparative) | 0.12 |
| 1.5 p.p.m. EDTMP (comparative) | 0.2 |
| 1.5 p.p.m. EDTMP+1.5 p.p.m. adipic acid | 0.05 |
| 1.5 p.p.m. EDTMP+1.5 p.p.m. glutaric acid | 0.12 |
| 1.5 p.pm. EDTMP+1.5 p.p.m. pimelic acid | 0.04 |
| 1.5 p.p.m. EDTMP+1.5 p.p.m. citric acid | 0.03 |

In a series of similar tests synergistic improvements were also observed for mixtures of EDTMP with succinic, suberic, azelaic and sebacic acids, and mixtures of amino trismethylene phosphonic acid with adipic, citric, succinic and sebacic acids.

We claim:

1. A composition for use in water treatment, which comprises (i) between 30% and 90% by weight of an amino-methylene phosphonic acid or an alkali metal or ammonium salt thereof, and (ii) between 10% and 70% of a water soluble polycarboxylic acid selected from the group consisting of adipic, glutaric, azelaic, sebacic, succinic, suberic, pimelic, and hydroxy carboxylic, or an alkali metal or ammonium salt thereof.

2. A composition according to claim 1 wherein the aminomethylene phosphonic acid has the formula $$R''-[NR''R]_nNR''-CR'R'PO_3H_2$$

(wherein R is an alkylene group, each R' is hydrogen or an organic radical and each R'' is hydrogen or an organic radical and each R'' is hydrogen or an unsubstituted or substituted alkyl group of from 1 to 20 carbon atoms, or a phosphonomethylene group $$-CR'R'PO_3H_2$$

and $n$ is an integer from 1 to 5).

3. A composition according to claim 2 wherein each R' is hydrogen.

4. A composition according to claim 3 wherein each R is an ethylene group.

5. A composition according to claim 4 wherein each R'' is a phosphonomethylene group —$CH_2PO_3H_2$.

6. A composition according to claim 5 wherein $n$ is 1.

7. A composition according to claim 6 wherein said polycarboxylic acid or alkali metal or ammonium salt thereof is in an amount from 20 to 60% by weight of the composition.

8. A composition according to claim 7 wherein the polycarboxylic acid is pimelic acid.

9. A composition according to claim 7 wherein the dicarboxylic acid is adipic acid.

10. A composition according to claim 7 wherein the polycarboxylic acid is citric acid.

11. A method of inhibiting corrosion of metal surfaces in contact with water systems, which comprises adding to the water from 20 to 100 parts per million of the composition of claim 2.

12. A method of dispersing particles in water which comprises adding to the water from 0.5 to 2% by weight of the composition of claim 1.

13. An improved method of inhibiting scale formation during the evaporation of water containing a threshold amount of an amino-methylene phosphonic acid, the improvement comprising incorporating in said water a polycarboxylic acid having from 4 to 10 carbon atoms, the total of said amino-methylene phosphonic acid and said polycarboxylic acid being between 0.25 and 100 parts per million by weight, and said polycarboxylic acid comprising from 10% to 70% of the total of said aminomethylene phosphonic acid and said polycarboxylic acid.

14. The process of claim 13 wherein said amino-methylene phosphonic acid has the formula

(wherein R is an alkylene group, each R' is hydrogen or an organic radical and each R'' is hydrogen or an organic radical and each R'' is hydrogen or an unsubstituted or substituted alkyl group of from 1 to 20 carbon atoms, or a phosphonomethylene group —$CR'R'PO_3H_2$ and $n$ is an integer from 1 to 5), wherein said polycarboxylic acid is selected from the group consisting of adipic, glutaric, azelaic, sebacic, succinic, suberic, pimelic, and hydroxy carboxylic, and wherein said polycarboxylic acid comprises between 20% and 60% of the said total.

15. The process of claim 14 wherein the concentration of the total of said amino-methylene phosphonic acid and said polycarboxylic acid is from 0.25 to 100 parts per million.

16. The process of claim 15 wherein said concentration is between 0.5 and 20 parts per million.

17. The process of claim 15 wherein said concentration is between 1 and 10 parts per million.

18. The process of claim 14 wherein said amino-methylene phosphonic acid is ethylenediamine tetrakis (methylene-phosphonic acid), and wherein the concentration of the total of said phosphonic acid and said polycarboxylic acid is from 1 to 10 parts per million.

19. The process of claim 18 wherein said concentration is from 1.5 to 5 parts per million.

20. The process of claim 18 wherein said polycarboxylic acid is adipic acid.

21. The process of claim 18 wherein said polycarboxylic acid is glutaric acid.

22. The process of claim 18 wherein said polycarboxylic acid is pimelic acid.

23. The process of claim 18 wherein said polycarboxylic acid is citric acid.

References Cited
UNITED STATES PATENTS

| | | | |
|---|---|---|---|
| 3,070,464 | 12/1962 | Levy | 134—41 |
| 3,072,502 | 1/1963 | Alfano | 134—3 |
| 3,288,846 | 11/1966 | Irani | 252—180 X |
| 3,303,139 | 2/1967 | Blaser | 252—180 |
| 3,336,221 | 8/1967 | Ralston | 252—180 X |
| 3,393,150 | 7/1968 | Ralston | 252—180 X |
| 3,434,969 | 3/1969 | Ralston | 252—180 X |

JOHN T. GOOLKASIAN, Primary Examiner

M. E. McCAMISH, Assistant Examiner

U.S. Cl. X.R.

134—3, 41; 210—58; 252—82, 175; 260—535, 537